(12) United States Patent
Cazenave et al.

(10) Patent No.: US 12,201,061 B2
(45) Date of Patent: Jan. 21, 2025

(54) ADJUSTABLE BILLET DEFLECTOR

(71) Applicant: DEERE & COMPANY, Moline, IL (US)

(72) Inventors: Blain J. Cazenave, Vacherie, LA (US); Dusk S. Mixon, Saint Amant, LA (US); John A. Dighton, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 602 days.

(21) Appl. No.: 17/527,774

(22) Filed: Nov. 16, 2021

(65) Prior Publication Data

US 2023/0148473 A1  May 18, 2023

(51) Int. Cl.
*A01D 41/127* (2006.01)
*A01D 45/10* (2006.01)

(52) U.S. Cl.
CPC ........... *A01D 41/127* (2013.01); *A01D 45/10* (2013.01)

(58) Field of Classification Search
CPC .............. A01D 41/127; A01D 41/1217; A01D 41/1271–1273; A01D 41/1276; A01D 43/073; A01D 43/08; A01D 45/10; A01D 61/00; A01D 61/02; A01F 12/48; A01F 29/02
See application file for complete search history.

(56) References Cited

U.S. PATENT DOCUMENTS

| | | |
|---|---|---|
| 537,690 A | 4/1895 | Landis |
| 623,109 A | 4/1899 | Schuman |
| 970,956 A | 9/1910 | Rudell |
| 1,031,472 A | 7/1912 | Schubert |
| 1,847,433 A | 3/1932 | Krause |
| 2,092,134 A | 9/1937 | Oppenheim |
| 4,155,602 A | 5/1979 | Quick |
| 4,270,337 A | 6/1981 | Pinto |
| 4,295,325 A | 10/1981 | Cannavan |
| 4,555,896 A | 12/1985 | Stiff et al. |

(Continued)

FOREIGN PATENT DOCUMENTS

| | | |
|---|---|---|
| CN | 103563556 A | 2/2014 |
| DE | 102019004647 A1 | 3/2018 |

(Continued)

*Primary Examiner* — Thomas B Will
*Assistant Examiner* — Robert E Pezzuto
(74) *Attorney, Agent, or Firm* — Michael Best & Friedrich LLP

(57) ABSTRACT

A cleaning arrangement for separating a billet material from an extraneous plant matter in a sugarcane harvester includes a cleaning chamber defining an inlet for the billet material and the extraneous plant matter, a first outlet for the extraneous plant matter, and a second outlet for the billet material. A fan is positioned within the cleaning chamber and configured to generate an airflow to direct the extraneous plant matter toward the first outlet. A billet deflector is located between the inlet and the first outlet and configured to direct the billet material toward the second outlet. An actuation mechanism is coupled to the billet deflector and is controllable to adjust the position of the billet deflector. A sensor is configured to generate a signal. A controller is programmed to activate the actuation mechanism to adjust the position of the billet deflector based on the signal.

20 Claims, 15 Drawing Sheets

(56) References Cited

U.S. PATENT DOCUMENTS

| | | |
|---|---|---|
| 5,031,392 A | 7/1991 | Baker |
| 5,092,110 A | 3/1992 | Dommert et al. |
| 5,129,219 A | 7/1992 | Baker |
| 5,167,581 A | 12/1992 | Haag |
| 5,379,578 A | 1/1995 | Landry et al. |
| 5,488,820 A | 2/1996 | Cannavan |
| 5,558,282 A | 9/1996 | Ameye et al. |
| 6,272,819 B1 | 8/2001 | Wendte et al. |
| 6,363,700 B1 | 4/2002 | Fowler |
| 6,497,546 B2 | 12/2002 | Wood et al. |
| 6,974,021 B1 | 12/2005 | Boevers |
| 7,195,557 B2 | 3/2007 | Hettiger |
| 8,682,540 B2 | 3/2014 | Missotten et al. |
| 8,924,030 B2 | 12/2014 | Wendte et al. |
| 9,084,393 B1 | 7/2015 | Singleton |
| 9,456,547 B2 * | 10/2016 | Cazenave .............. A01D 45/10 |
| 9,702,753 B2 | 7/2017 | Johnson et al. |
| 9,788,485 B2 | 10/2017 | Craig et al. |
| 10,091,934 B2 | 10/2018 | Dugas et al. |
| 10,317,272 B2 | 6/2019 | Bhavsar et al. |
| 10,412,888 B2 * | 9/2019 | Matway .............. A01D 41/1271 |
| 10,645,876 B2 | 5/2020 | Dugas et al. |
| 10,806,079 B2 | 10/2020 | Gunda et al. |
| 10,959,376 B2 * | 3/2021 | Pereira .................. A01D 45/10 |
| 11,224,170 B2 | 1/2022 | Dighton et al. |
| 2004/0053653 A1 | 3/2004 | Isfort et al. |
| 2004/0224735 A1 | 11/2004 | Hinds |
| 2005/0016145 A1 | 1/2005 | Huff, Jr. |
| 2007/0135935 A1* | 6/2007 | Maertens ........... A01D 41/1276 700/28 |
| 2009/0017885 A1 | 1/2009 | Halls |
| 2009/0272619 A1 | 11/2009 | Leal et al. |
| 2011/0307149 A1 | 12/2011 | Pighi et al. |
| 2012/0024670 A1 | 2/2012 | Koerselman et al. |
| 2012/0110969 A1 | 5/2012 | Hinds |
| 2013/0095899 A1 | 4/2013 | Knapp |
| 2013/0145940 A1 | 6/2013 | Roberge et al. |
| 2013/0251484 A1 | 9/2013 | Wood et al. |
| 2014/0128134 A1 | 5/2014 | Linde |
| 2014/0295923 A1 | 10/2014 | Vergote |
| 2015/0327438 A1 | 11/2015 | Cazenave et al. |
| 2016/0057927 A1 | 3/2016 | Bojsen et al. |
| 2016/0088794 A1 | 3/2016 | Baumgarten et al. |
| 2016/0252384 A1 | 9/2016 | Wilson et al. |
| 2017/0042088 A1 | 2/2017 | Nykamp et al. |
| 2017/0055446 A1 | 3/2017 | Nykamp et al. |
| 2017/0086372 A1 | 3/2017 | Palla et al. |
| 2017/0112058 A1 | 4/2017 | Craig et al. |
| 2017/0112063 A1 | 4/2017 | Craig |
| 2017/0325402 A1 | 11/2017 | Craig |
| 2018/0084718 A1 | 3/2018 | Baumgarten et al. |
| 2018/0116114 A1 | 5/2018 | Craig et al. |
| 2019/0037770 A1 | 2/2019 | Dugas et al. |
| 2019/0183052 A1 | 6/2019 | Craig et al. |
| 2019/0230856 A1 | 8/2019 | Dighton et al. |
| 2019/0261564 A1 | 8/2019 | Gunda et al. |
| 2019/0350136 A1 | 11/2019 | Craig |
| 2020/0077591 A1 | 3/2020 | Xu et al. |
| 2020/0137958 A1 | 5/2020 | Hansen et al. |
| 2020/0404842 A1 | 12/2020 | Dugas et al. |
| 2021/0112714 A1* | 4/2021 | Murray .............. A01D 41/1274 |
| 2021/0400870 A1 | 6/2021 | Sunil et al. |
| 2021/0195840 A1 | 7/2021 | Puryk et al. |
| 2021/0315161 A1 | 10/2021 | Pereira et al. |
| 2021/0329840 A1 | 10/2021 | Craig |
| 2022/0232768 A1 | 7/2022 | Craig |
| 2022/0232772 A1 | 7/2022 | Craig et al. |
| 2023/0028281 A1 | 1/2023 | Lorriette et al. |

FOREIGN PATENT DOCUMENTS

| | | |
|---|---|---|
| DE | 102018202323 A1 | 8/2019 |
| DE | 102016116043 A1 | 1/2021 |
| EP | 2241175 A1 | 10/2010 |
| FR | 2334285 A | 7/1977 |
| GB | 2517049 A | 2/2015 |
| JP | H10215633 A | 8/1998 |
| WO | WO0032026 A1 | 6/2000 |
| WO | 2017187249 A1 | 2/2017 |
| WO | 2017094588 A1 | 6/2017 |
| WO | 2018037543 A1 | 3/2018 |
| WO | WO2018037542 A1 | 3/2018 |
| WO | 2019220815 A1 | 8/2018 |
| WO | 2018142768 A1 | 11/2019 |
| WO | 2021049476 A1 | 3/2021 |
| WO | 2022137791 A1 | 6/2022 |

* cited by examiner

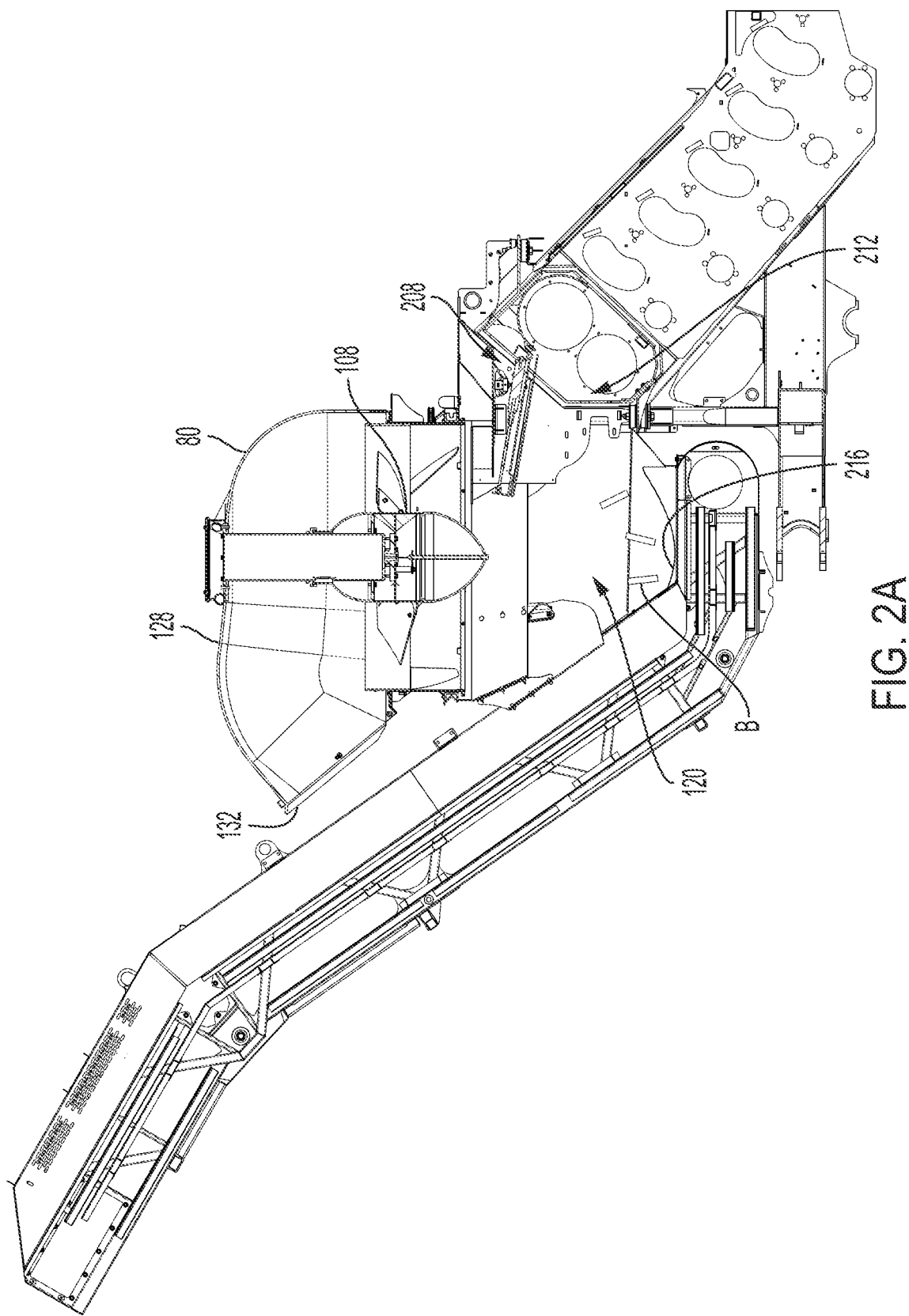

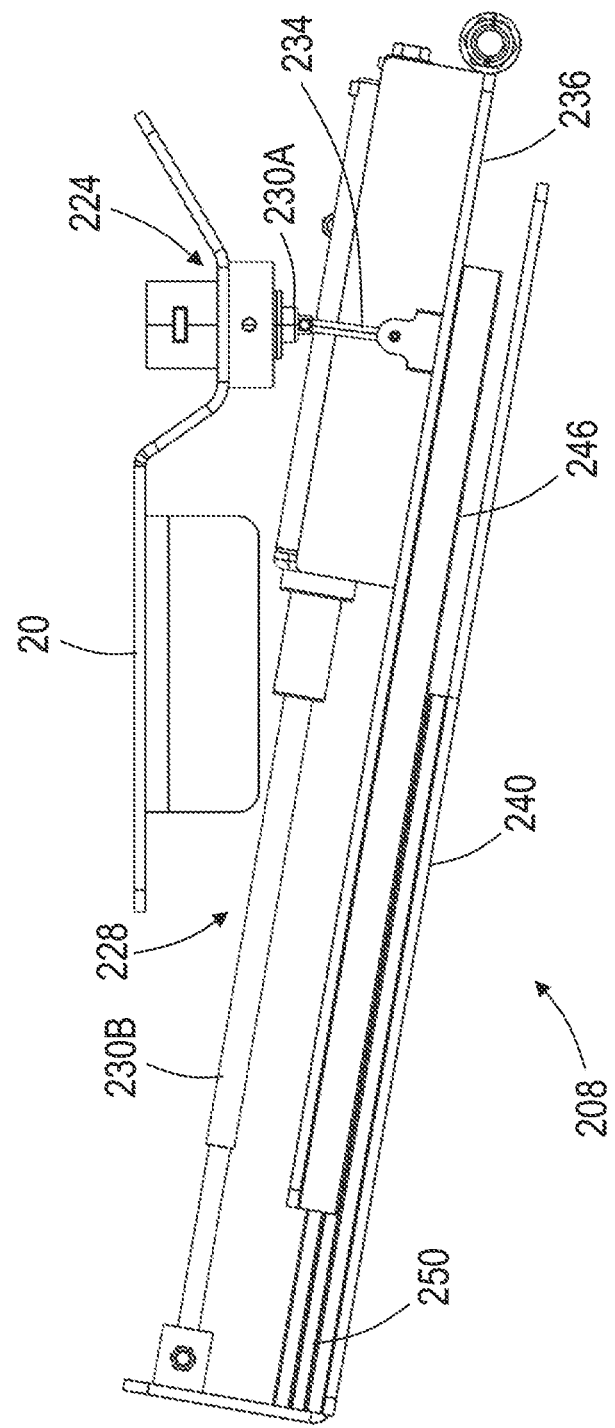

ADJUSTABLE BILLET DEFLECTOR

BACKGROUND

The present disclosure relates to a sugarcane harvester and more particularly to a cleaning arrangement of a sugar cane harvester that assists in separating sugarcane billets from leaves, dirt, and other trash.

A sugarcane harvester severs sugarcane plants from the ground with a base cutter assembly and transports the severed plants to a set of chopping drums that chop the severed plant into smaller billets. The billets are sent through a cleaning arrangement to separate the billets from non-billet material such as leaves, dirt, and other trash. Passing through the cleaning system, the billets are then dispatched to stowed in, for example, a trailing vehicle.

SUMMARY

A cleaning arrangement for separating a billet material from an extraneous plant matter in a sugarcane harvester includes a cleaning chamber defining an inlet for the billet material and the extraneous plant matter, a first outlet for the extraneous plant matter, and a second outlet for the billet material. A fan is positioned within the cleaning chamber and configured to generate an airflow to direct the extraneous plant matter toward the first outlet. A billet deflector is located between the inlet and the first outlet and configured to direct the billet material toward the second outlet. An actuation mechanism is coupled to the billet deflector and is controllable to adjust the position of the billet deflector. A sensor is configured to generate a signal. A controller is programmed to activate the actuation mechanism to adjust the position of the billet deflector based on the signal.

A method of separating a billet material from an extraneous plant matter in a sugarcane harvester includes impinging the billet material against a billet deflector to direct the billet material across a cleaning chamber, modifying a trajectory of the billet material away from a first outlet and towards a second outlet, monitoring an output signal of a sensor, determining whether the output signal is outside of a predetermined range, and activating an actuation mechanism in response to the signal to modify a position of the billet deflector relative to a fan when the output signal is outside of the predetermined range.

A cleaning arrangement for separating a billet material from an extraneous plant matter in a sugarcane harvester includes a cleaning chamber defining an inlet for the billet material and the extraneous plant matter, a first outlet for the extraneous plant matter, and a second outlet for the billet material. A fan is positioned within the cleaning chamber and configured to generate an airflow to direct the extraneous plant matter toward the first outlet. A billet deflector is located between the inlet and the first outlet and configured to direct the billet material toward the second outlet. An actuation mechanism is coupled to the billet deflector and is controllable to adjust the position of the billet deflector. A controller is programmed to compare a current position of the billet deflector to a desired position of the billet deflector. The controller is programmed to activate the actuation mechanism if the current position of the billet deflector differs from the desired position of the billet deflector by more than a predetermined threshold.

Other features and aspects of the disclosure will become apparent by consideration of the following detailed description and accompanying drawings.

BRIEF DESCRIPTION OF THE DRAWINGS

FIG. 2A is a cross-sectional view of a cleaning arrangement of the sugarcane harvester having a billet deflector.

FIG. 2B is a side view of the billet deflector.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Before any implementations of the disclosure are explained in detail, it is to be understood that the disclosure is not limited in its application to the details of construction and the arrangement of components set forth in the following description or illustrated in the following drawings. The disclosure is capable of supporting other implementations and of being practiced or of being carried out in various ways.

Figure 1A:
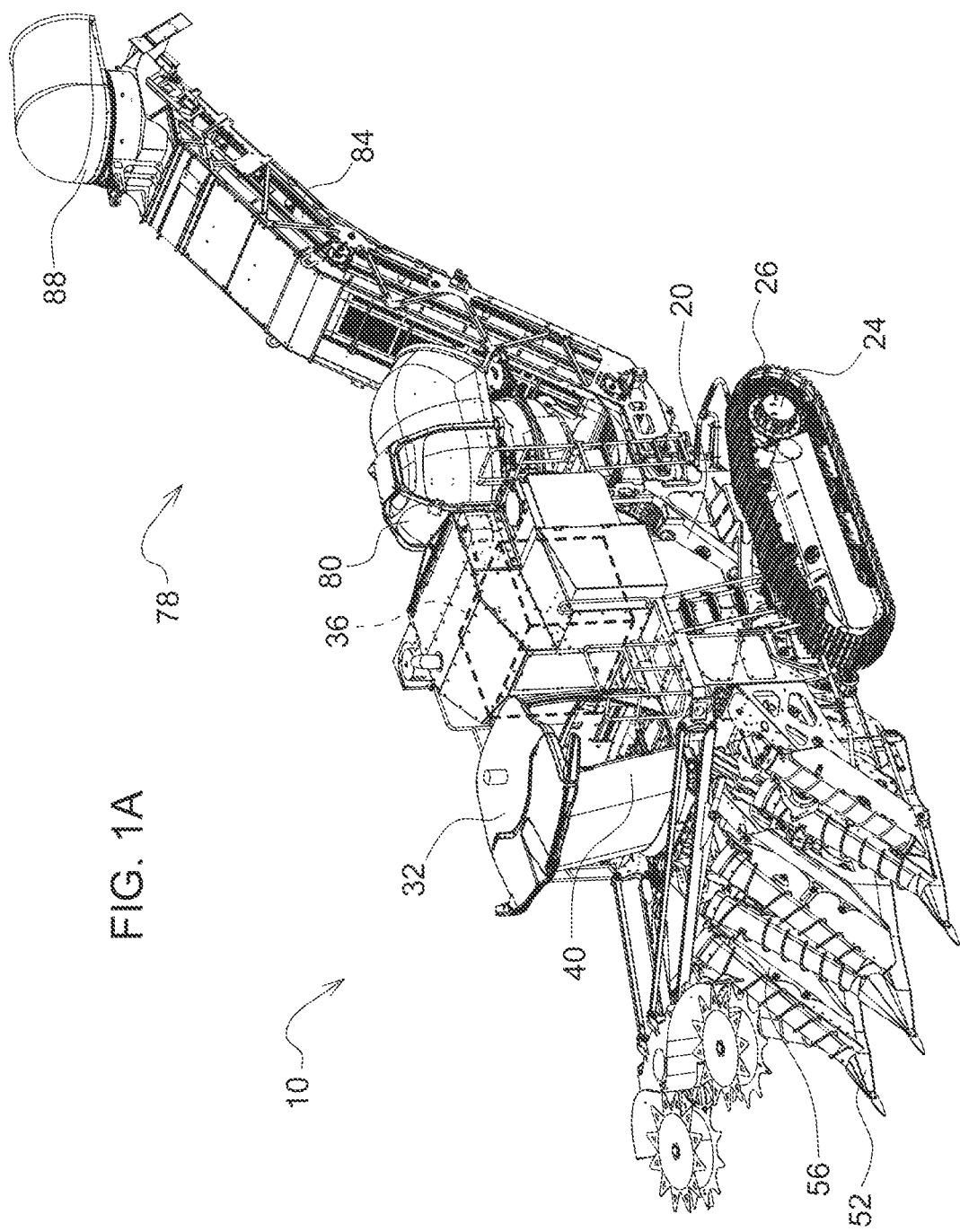
FIG. 1A is a perspective view of a sugarcane harvester.
Figure 1B:
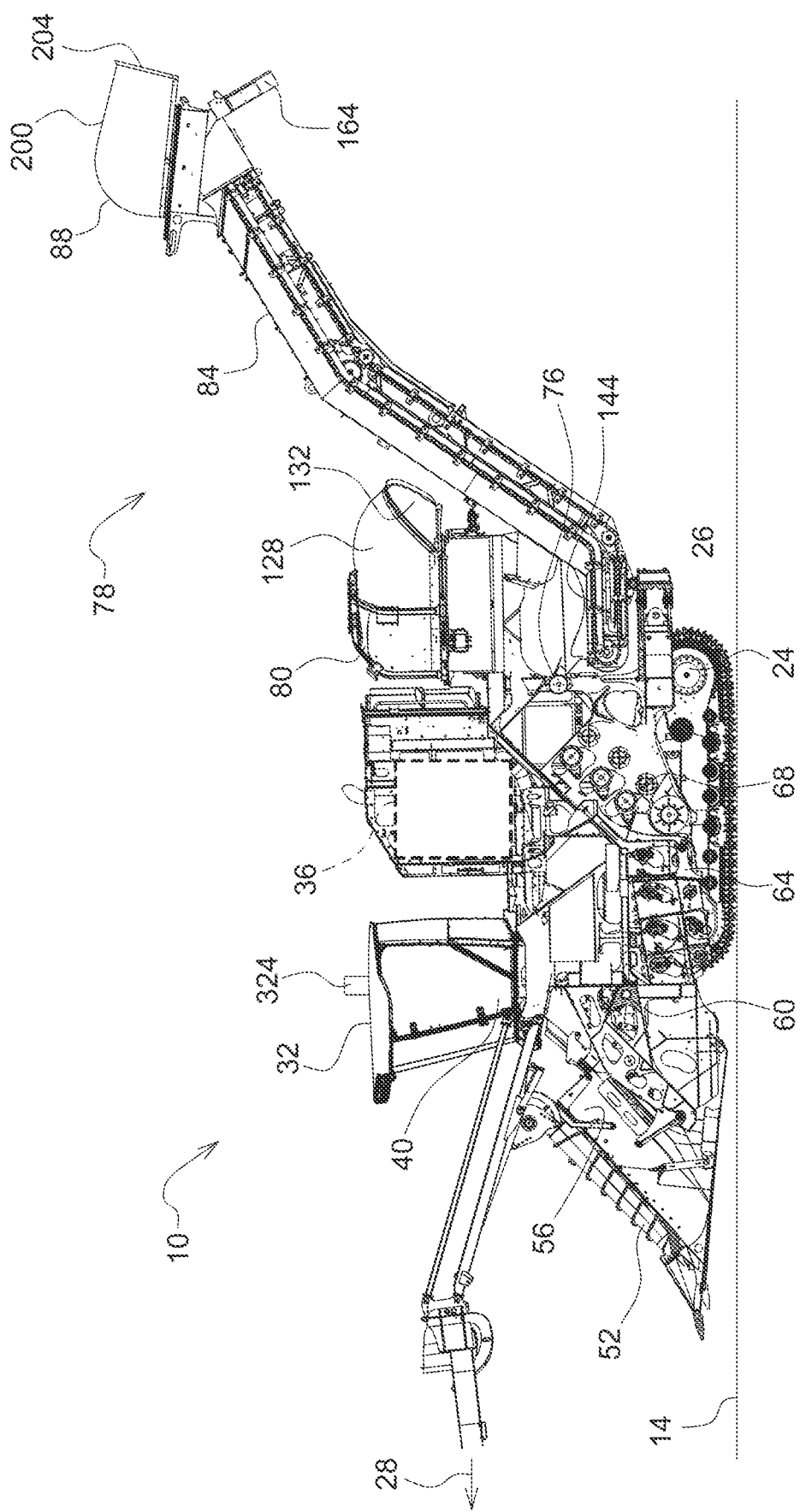
FIG. 1B is a side view of the sugarcane harvester of FIG. 1.

FIG. 1A illustrates a harvester 10, such as a sugarcane harvester, configured to harvest crop from a field 14. The illustrated harvester 10 includes a main frame 20 supported on wheels 24 that engage the field 14 in order to move the harvester 10 across the field 14 in a direction of travel 28 (FIG. 1B). In some implementations, the wheels 24 may include continuous tracks 26 or other traction devices. An operator's cab 32 is mounted on the frame 20 above a prime mover 36, such as an engine. The prime mover 36 may be an internal combustion engine or other such device for providing motive power. The harvester 10 includes a throttle 40 for controlling a speed of the prime mover 36 and thus a speed of the harvester 10 (also referred to as the harvester speed). The harvester 10 includes a pair of crop lifters 52 mounted to the front of the frame 20, defining an inlet 56 for receiving the crop.

FIG. 1B illustrates a side view of the harvester 10 with portions removed. The crop lifters 52 cooperate with a knockdown roller 60 and a base cutter 64 to remove the crop from the field 14. Feed rollers 68 are disposed within the inlet 56 to feed the crop from the field 14 into the harvester 10. The feed rollers 68 operate at a feed speed. The harvester 10 further includes a chopper 76, and a cleaning arrangement or cleaning system 78 (also referred to herein as residue discharge system) including a primary separator 80 and/or a secondary separator 88. The harvester 10 also includes a conveyor 84 (also referred to herein as an elevator) connecting the primary separator 80 and the secondary separator 88.

Figure 1C:
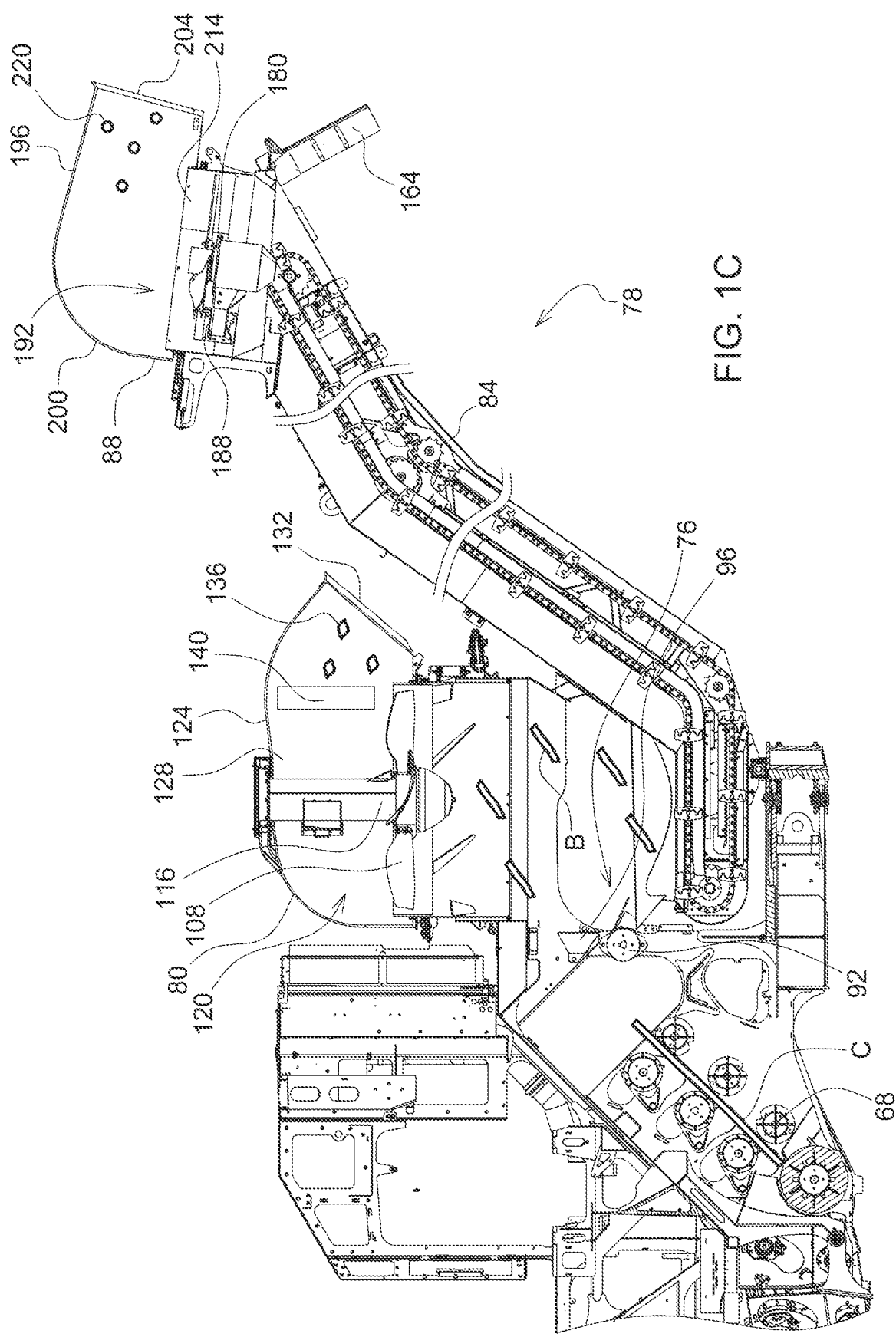
FIG. 1C is a cross-sectional side view of a portion of the sugarcane harvester of FIG. 1.

FIG. 1C illustrates the chopper 76 and the cleaning system 78 in more detail. The chopper 76 is disposed adjacent the feed rollers 68 to cut the crop. The chopper 76 may include a set of chopper drums 92 driven by a motor. The chopper drums 92 include a blade 96 for cutting the stalks of the crop. In one implementation, the chopper 76 may include counter rotating drum cutters with overlapping blades. In other implementations, the chopper 76 may include any suitable blade or blades for cutting the stalks of crop. The chopper 76 cuts the stalks of crop, referred to as cane C, into crop billet B, which includes pieces of the stalk. The crop also includes dirt, leaves, roots, and other plant matter, which is collectively referred to herein as extraneous plant matter. The chopper 76 operates at a chopper speed, which may be adjusted to change a size and weight of the resulting chopped crop pieces. The chopper 76 directs a stream of the cut crop, including crop billet B and extraneous plant matter, to the cleaning system 78 and specifically to the primary separator 80.

The cleaning system 78 is generally configured to distinguish between the billet B and the extraneous plant matter. (The extraneous plant matter may be referred to herein as residue, especially when ejected from the cleaning system 78). The cleaning system 78 is generally operable at an adjustable cleaning speed. The primary separator 80 is coupled to the frame 20 and disposed downstream of the chopper 76 for receiving cut crop from the chopper 76. The primary separator 80 generally separates the extraneous plant matter from the crop billet B by way of any suitable mechanism for cleaning the cut crop, such as a fan, a source of compressed air, a rake, a shaker, or any other mechanism that distinguishes various types of crop parts by weight, size, shape, etc. in order to separate extraneous plant matter from crop billet. In the illustrated implementation, the primary separator 80 includes a primary fan 108 driven at a primary fan speed by a primary motor 116. The primary fan speed can be varied by controlling the primary motor 116. Thus, in the illustrated implementation, the cleaning speed may include the primary fan speed; however in other implementations, the cleaning speed may include air speed (e.g., of released compressed air or any other pressurized air), rake speed, shaker speed, etc. The primary separator 80 further includes a primary cleaning chamber 120 generally defined by a primary cleaner housing 124.

The primary separator 80 includes a primary hood 128 coupled to the main frame 20. The primary hood 128 may have a domed shape, or other suitable shape, and includes a primary opening 132 (also referred to herein as first outlet) angled out from the harvester 10 and facing slightly down towards the field 14. The hood directs separated extraneous plant matter through the primary opening 132 to the outside of the harvester, back onto the field 14. In some implementations the primary separator 80 includes a primary shredder 140 that shreds the residue into smaller pieces (primary residue 136), which can be selectively activated by an operator. The separated crop, including mostly crop billet B, is directed to an outlet of the cleaning chamber 120 and is deposited in a basket 144 disposed below the primary separator 80.

With continued reference to FIG. 1C, the conveyor 84 is coupled to a rear of the frame 20 for receiving the separated crop from the basket 144. The conveyor 84 extends from the rear of the harvester 10 and terminates at a discharge opening 164 (also referred to herein as a second outlet) elevated to a height suitable for discharging cleaned crop into a vehicle. The second outlet does not discharge the harvested material to the field, like the first outlet, but instead discharges the material to a collection vehicle. A secondary separator 88 is disposed adjacent the discharge opening 164 for cleaning the crop a second time before being discharged into the vehicle. The secondary separator 88 may include a fan, a compressed air source, a rake, a shaker, or other suitable device. In the illustrated implementation, the secondary separator 88 includes a secondary fan 180 driven at a secondary fan speed by a secondary motor 188. The secondary separator 88 includes a secondary cleaning chamber 192 defined by a secondary cleaner housing 196. The secondary cleaner housing 196 includes a secondary hood 200 having a secondary opening 204. The secondary crop cleaner is operable such that additional extraneous plant matter is discharged through the secondary opening 204 and the remaining separated crop is discharged through the discharge opening 164 and into the vehicle. In some implementations, the secondary separator 88 includes a secondary shredder 214 that shreds the residue into smaller pieces (secondary residue 220), which can be selectively activated by the operator.

FIG. 2A illustrates the primary separator 80, and more clearly illustrates a billet deflector 208 positioned at an outlet of the chopper 76, which coincides with an inlet 212 of the primary cleaning chamber 120. The billet deflector 208 is positioned within a flow path of the material entering the primary cleaning chamber 120 such that the material, such as the crop billet material B, impinges against the billet deflector 208 and is physically redirected by the contact. The physical contact between the material and the billet deflector 208 (impinging against the billet deflector 208 and moving across the billet deflector 208) directs the crop across the cleaning chamber and additionally promotes separation of the billet material B from the extraneous plant matter. Use of a billet deflector 208 decreases losses of crop billet B through the opening or outlet 132 in the hood 128 as the crop billet B is redirected in a direction away from the outlet 132. The crop billet B is directed instead toward a separate outlet 216 of the primary separator 80, through which the billet material B is directed to the basket 144, conveyor 84, and discharge opening 164 (shown in FIGS. 1B and 1C). The extraneous plant matter, being generally lighter and less dense than the crop billet material B, impinges against the billet deflector 208 with less force and is drawn by the fan 108 through the opening 132, where it is scattered to the field 14.

Placement and orientation of the billet deflector 208 relative to the inlet 212 of the cleaning chamber 120 (in addition to other settings such as fan speed, crop condition, harvesting applications, etc.) factors into the billet loss through the outlet 132 in the hood 128. If the billet deflector 208 is positioned at a first angle or has a first length that does not substantially direct the billet material B away from the fan 108 and outlet 132, the amount of billet loss through the outlet 132 is greater than a second angle or has a second length that does substantially direct the billet material B away from the fan 108 and outlet 132. Similarly, the placement and orientation of the billet deflector 208 factors into the waste harvest of the extraneous plant matter through the outlet 216 to the basket 144. If the billet deflector 208 is positioned at the second angle or has the second length to minimize billet loss through the outlet 132, the fan 108 is unable to efficiently draw the extraneous plant matter through the outlet 132 in the hood 128, resulting in unwanted harvesting of the extraneous plant matter.

FIGS. 3-8 illustrate the billet deflector 208 positioned at various angles and extended/retracted to various lengths to modify the effect of the billet deflector 208 on the chopped billet material B and the extraneous plant matter. As shown in greater detail in FIGS. 2B and 2C, a first adjustment mechanism (FAM) 224 and a second adjustment mechanism (SAM) 228 are coupled to the billet deflector 208 As shown in FIGS. 3-8, the first adjustment mechanism 224 adjusts an angle of the billet deflector 208 relative to the frame 20, the inlet 212, and the fan 108. The second adjustment mechanism 228 adjusts a length of the billet deflector 208. The length and angle of the billet deflector 208 may be controlled together or separately and may be adjusted simultaneously or at distinct times.

Figure 2C:
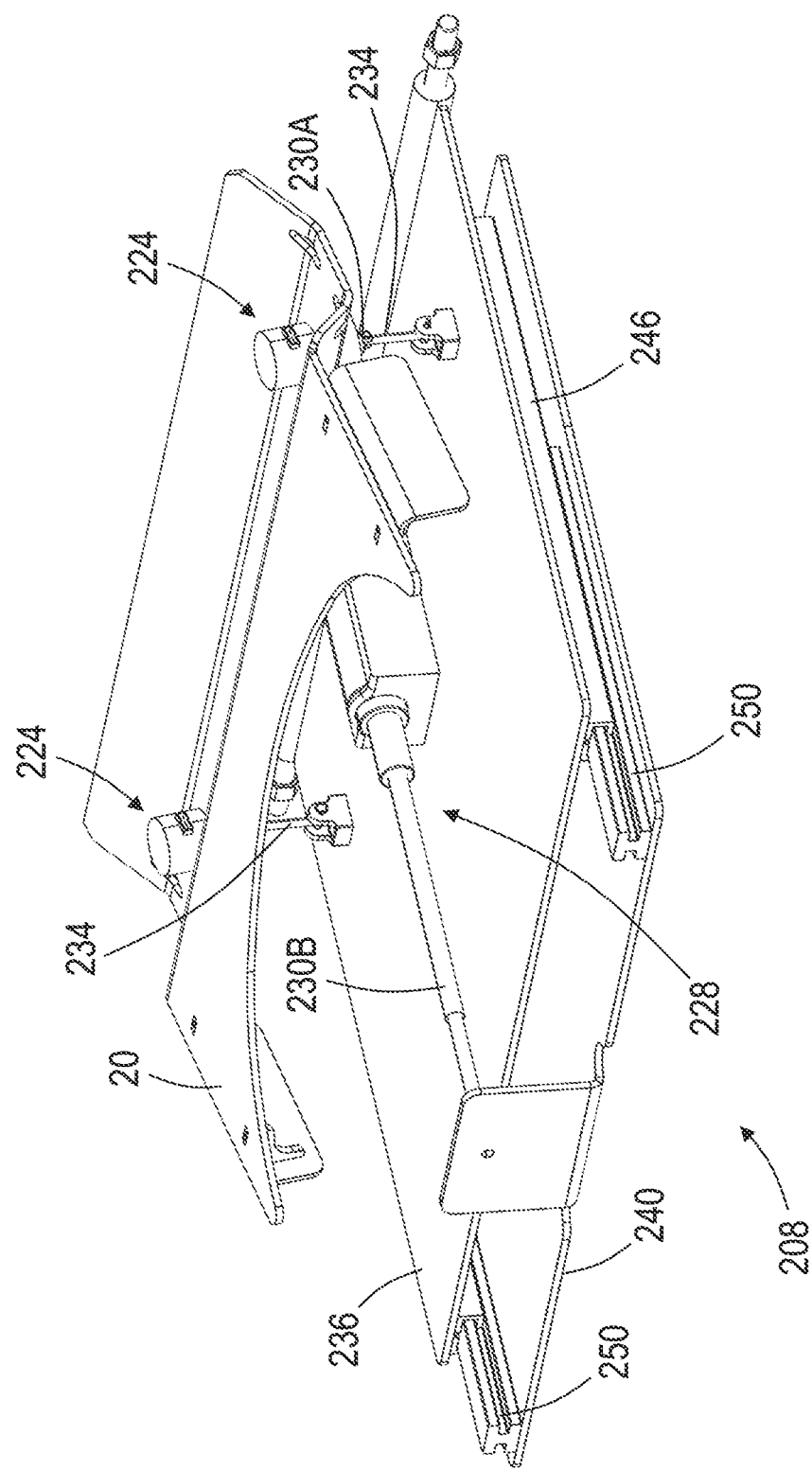
FIG. 2C is a perspective view of the billet deflector.

With continued reference to FIGS. 2B-2C, the first adjustment mechanism 224 includes a first linear actuator 230A coupled at a first end to the frame 20 of the harvester 10 and coupled to the billet deflector 208 at a second end. The first linear actuator 230A extends non-parallel with the billet deflector 208 and moves between an extended position and a retracted position to adjust the angle of the billet deflector 208. The first linear actuator 230A is located above the billet deflector 208. A distal end of a piston of the linear actuator 230A is coupled to the billet deflector 208 via a rod 234 that is rotatably coupled to one or both of the billet deflector 208 and the piston of the linear actuator 230A. When the linear actuator 230A is extended (downward), the billet deflector 208 is rotated about a rotational axis 232 to decrease an angle of the billet deflector 208 relative to a horizontal reference plane oriented parallel to the ground surface 14. When the linear actuator 224 is retracted (upward), the billet deflector is rotated about the rotational axis 232 to increase the angle of the billet deflector 208. As shown in FIG. 2C, the first adjustment mechanism 224 includes two separate linear actuators 230A spaced apart from one another to share the load/weight of the billet deflector 208 and rotation of the billet deflector 208.

The second adjustment mechanism 228 includes a second linear actuator 230B coupled at a first portion 236 of the billet deflector 208 and coupled to a second portion 240 of the billet deflector 208 at a second end. The second adjustment mechanism/linear actuator 228 extends and retracts in a direction that is substantially parallel with the plane of the billet deflector 208. The separate first and second portions 236, 240 overlap one another when the billet deflector 208 is in a retracted position. The first and second portions 236, 240 are coupled to one another via, for example, tracks 246, 250, (or alternatively, fasteners and slots, etc.) and limited to linear in-plane translation relative to one another, as shown in FIGS. 3-7. As shown, the tracks 250 coupled to the second portion 240 of the billet deflector are I-shaped and slide within a slot of the tracks 246 coupled to the first portion 236. When the linear actuator 228 extends, the second portion 240 moves relative to the first portion 236 to increase the overall length of the billet deflector. The linear actuators 224, 228 are electrically powered solenoids, though in other embodiments may be other electrical, pneumatic, or hydraulic systems capable of generating linear extension of the second portion 240 relative to the first portion 236 and capable of generating rotation of the billet deflector 208 (or rotation of one of the portions 236, 240 of the billet deflector 208). In some embodiments, a single actuator may function to generate both the linear translation of the portion 240 and rotation of the deflector 208.

The various positions (e.g., lengths, angles, etc.) of the billet deflector 208, as shown in FIGS. 3-8, are only a few of the potential positions achievable, with the billet deflector 208 being movable to various angles between a maximum and minimum angle and various lengths between a maximum length and a minimum length. The descriptions of FIGS. 3-8 identify how the material from the inlet 212 interacts differently with the billet deflector 208 depending on the position of the billet deflector 208. These descriptions assume similar harvesting conditions, such as similar material throughput. In operation, these harvesting conditions may be utilized as inputs for modifying the position of the billet deflector 208. As such, an impingement force against the billet deflector 208 being greater at a first position relative to a second position assumes these similar harvesting conditions, though in normal use, the second position may be utilized when the material throughput is less such that the difference in the impingement force is never realized in normal use. In some embodiments, it is desirable that the separation of the billet material B and the extraneous plant matter is consistent, even in view of changing harvest conditions. To this end, the differences identified in the descriptions of FIGS. 3-8 may be minimized by controlling the billet deflector 208 to account for these changes in harvest conditions.

Figure 3:
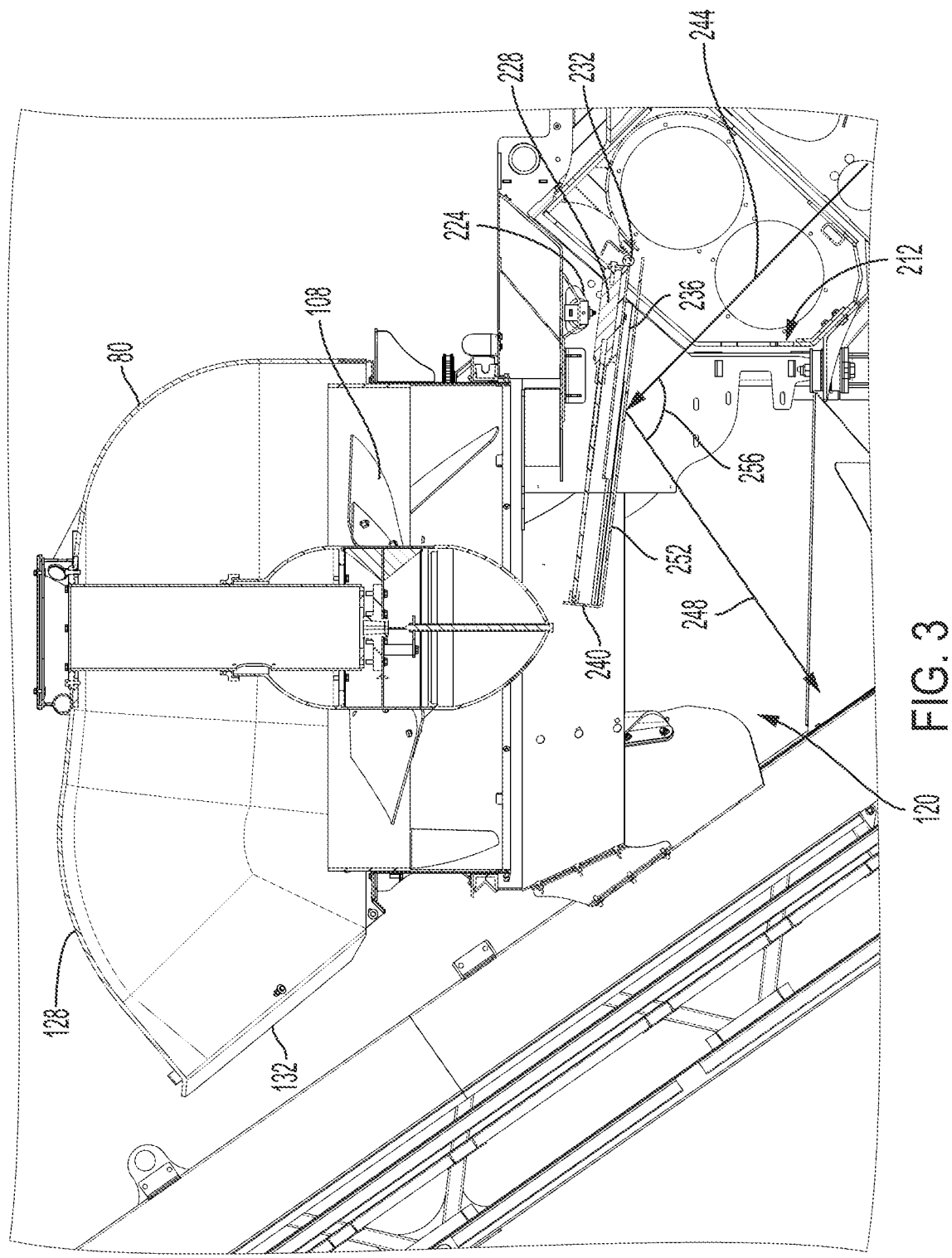
FIG. 3 is a cross-sectional view of the cleaning arrangement having the billet deflector in a first position and orientation.

FIG. 3 illustrates the billet deflector 208 in a first position and orientation that is lowered and fully extended. In the fully extended position, less extraneous plant matter is drawn through the outlet 132 (relative to a more retracted position) as the billet deflector blocks a greater percentage of the fan 108. Further, in the fully extended position, the harvested material interacts with the billet deflector 208 for a greater amount of time, which can increase the separation between the billet material B and the extraneous plant matter. Additionally, in the lowered position, the material through the inlet 212 of the cleaning chamber 120 impinges against the billet deflector at a lesser angle of impingement 256 (compared to a raised position shown in FIG. 4), thereby directing more material towards the outlet 216 and basket 144 and away from the outlet 132 of the hood 128. Written another way, the chopped material enters the inlet 212 in a first direction 244 and the impingement surface 252 (the lower surface of the billet deflector 208) against which the chopped material strikes is nearer perpendicular to the direction 244 than in the raised position (FIG. 4) such that the chopped material rebounds off of the impingement surface 252 in a second direction 248 towards the outlet 216. As such, the position and orientation shown in FIG. 3 results in high yield (i.e., retention of crop that will be sent to the mill for harvesting) of the crop billet B through the outlet 216, but also results in relatively high waste harvest of the extraneous plant matter through the outlet 216.

Figure 4:
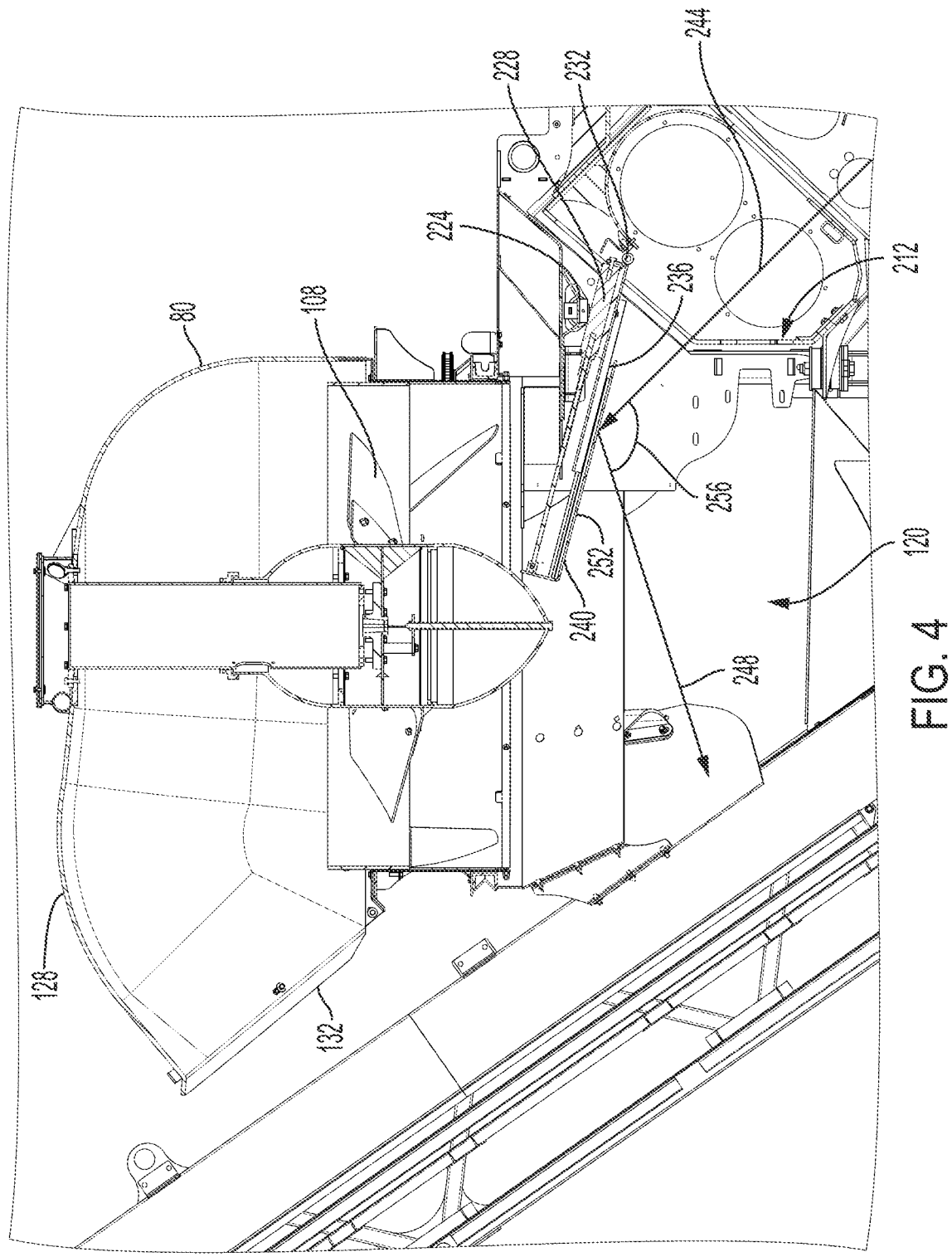
FIG. 4 is a cross-sectional view of the cleaning arrangement having the billet deflector in a second position and orientation.

FIG. 4 illustrates the billet deflector 208 in a second position and orientation that is raised and fully extended. In comparison to the position and orientation shown in FIG. 3, the raised position increases the angle of impingement 256 such that the material is directed more closely to the outlet 132 of the hood 128 and the impinging force is lessened such that the impact is more of a glancing blow with a shallow reflection angle than the lowered position shown in FIG. 3. As such, the position and orientation shown in FIG. 4 results in a potentially decreased yield of the crop billet B relative to the position and orientation shown in FIG. 3 (due to loss of crop billet B through the outlet 132), however, the arrangement also results in increased efficiency of the fan 108 to draw out the extraneous plant matter such that it results in decreased waste harvest through the outlet 216.

Figure 5:
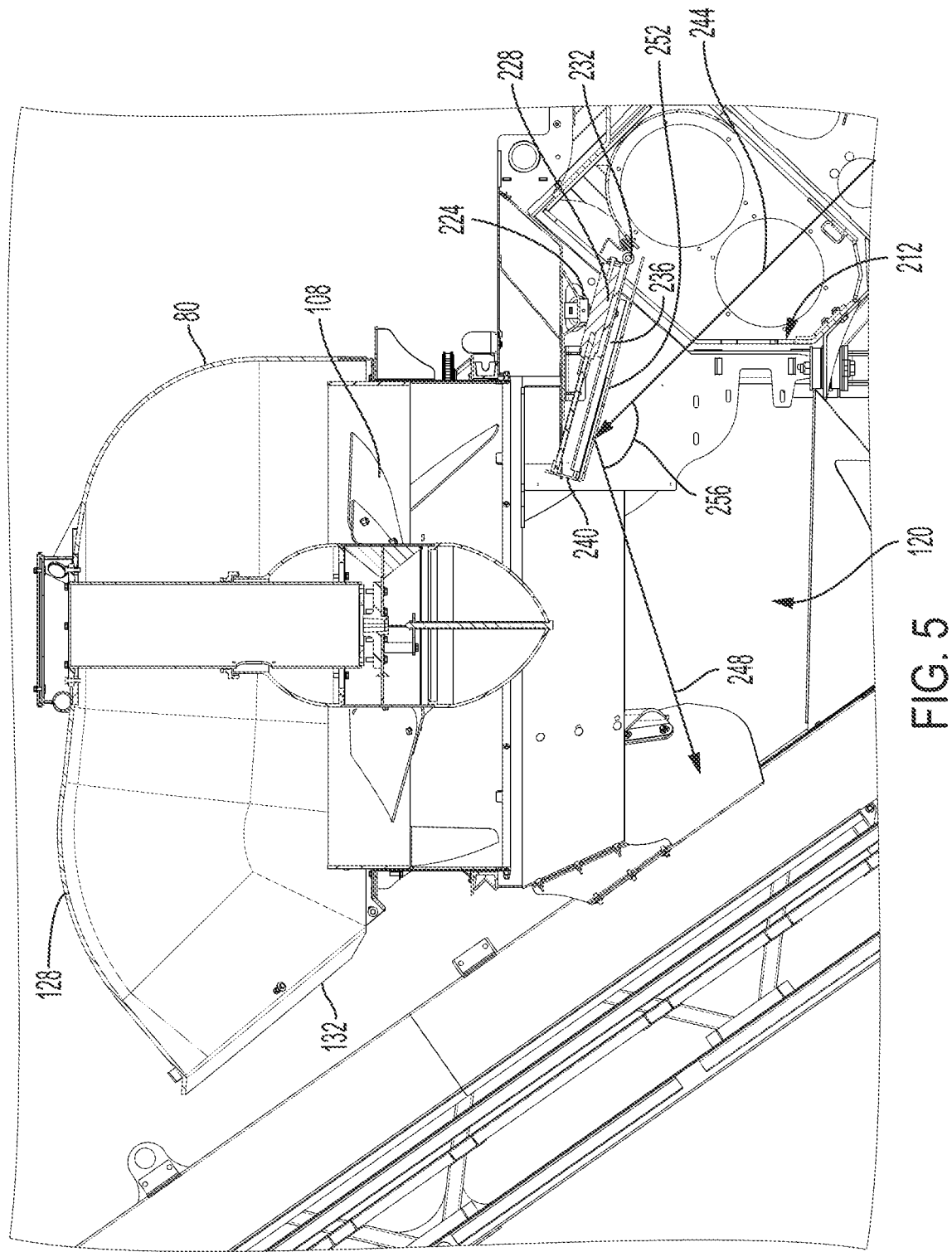
FIG. 5 is a cross-sectional view of the cleaning arrangement having the billet deflector in a third position and orientation.

FIG. 5 illustrates the billet deflector 208 in a third position and orientation that is raised and fully retracted. In comparison to the position and orientation shown in FIG. 4, the fully retracted position decreases the overall surface area of the impingement surface 252 such that more material entering the inlet 212 bypasses the billet deflector 208 and instead passes to the outlet 132. As such, the position and orientation shown in FIG. 5 results in a potentially decreased yield of the crop billet B relative to the position and orientation shown in FIG. 4 (due to loss of crop billet B through the outlet 132), however, the arrangement also results in increased efficiency of the fan 108 to draw out the extraneous plant matter such that it results in decreased waste harvest through the outlet 216.

Figure 6:
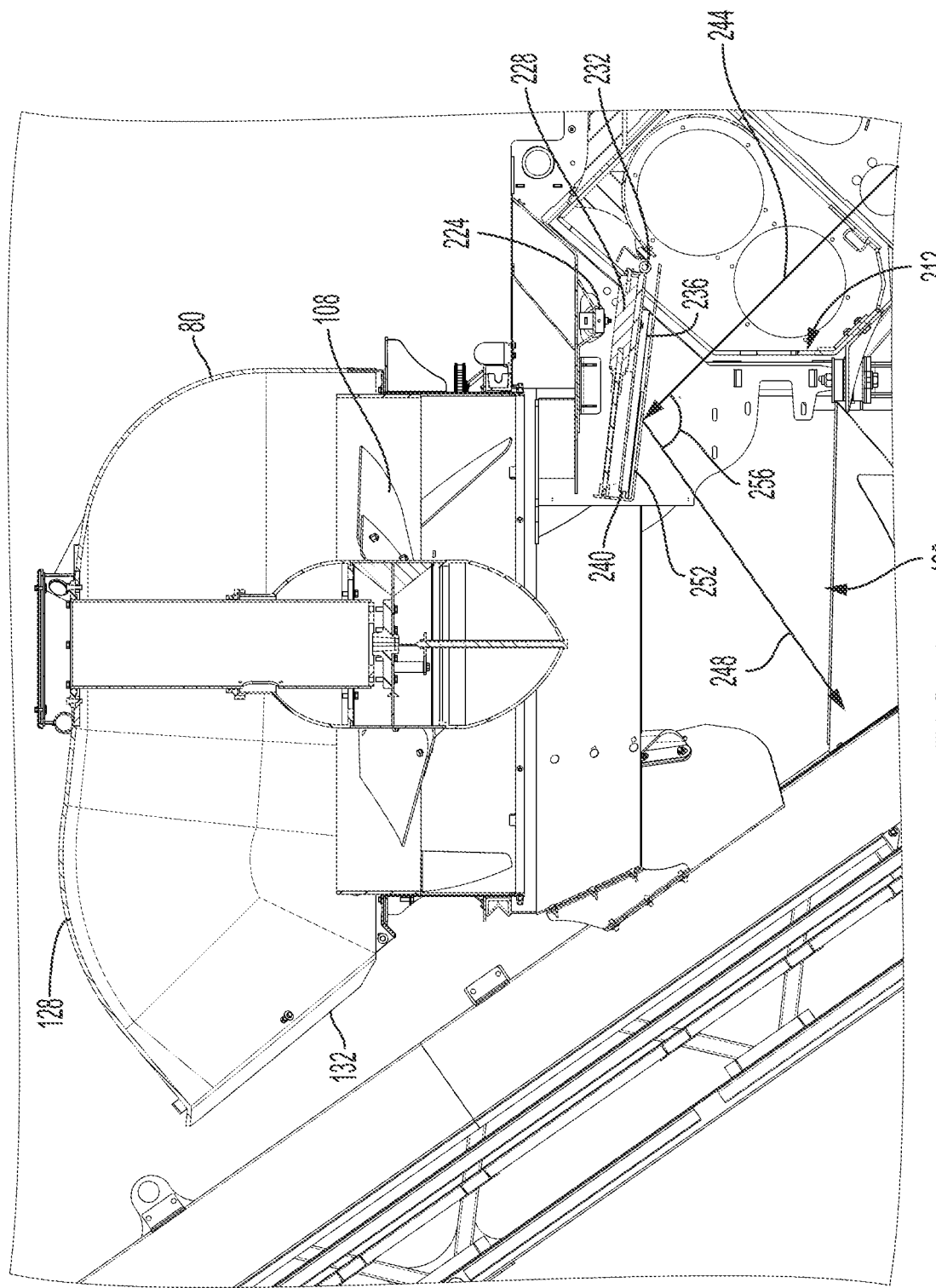
FIG. 6 is a cross-sectional view of the cleaning arrangement having the billet deflector in a fourth position and orientation.

FIG. 6 illustrates the billet deflector 208 in a fourth position and orientation that is lowered and fully retracted. This position and orientation has the benefits of the angle shown in FIG. 3 and the length shown in FIG. 5. The shorter length results in decreased waste harvest and the lower position results in a lesser angle of impingement 256.

Figure 7:
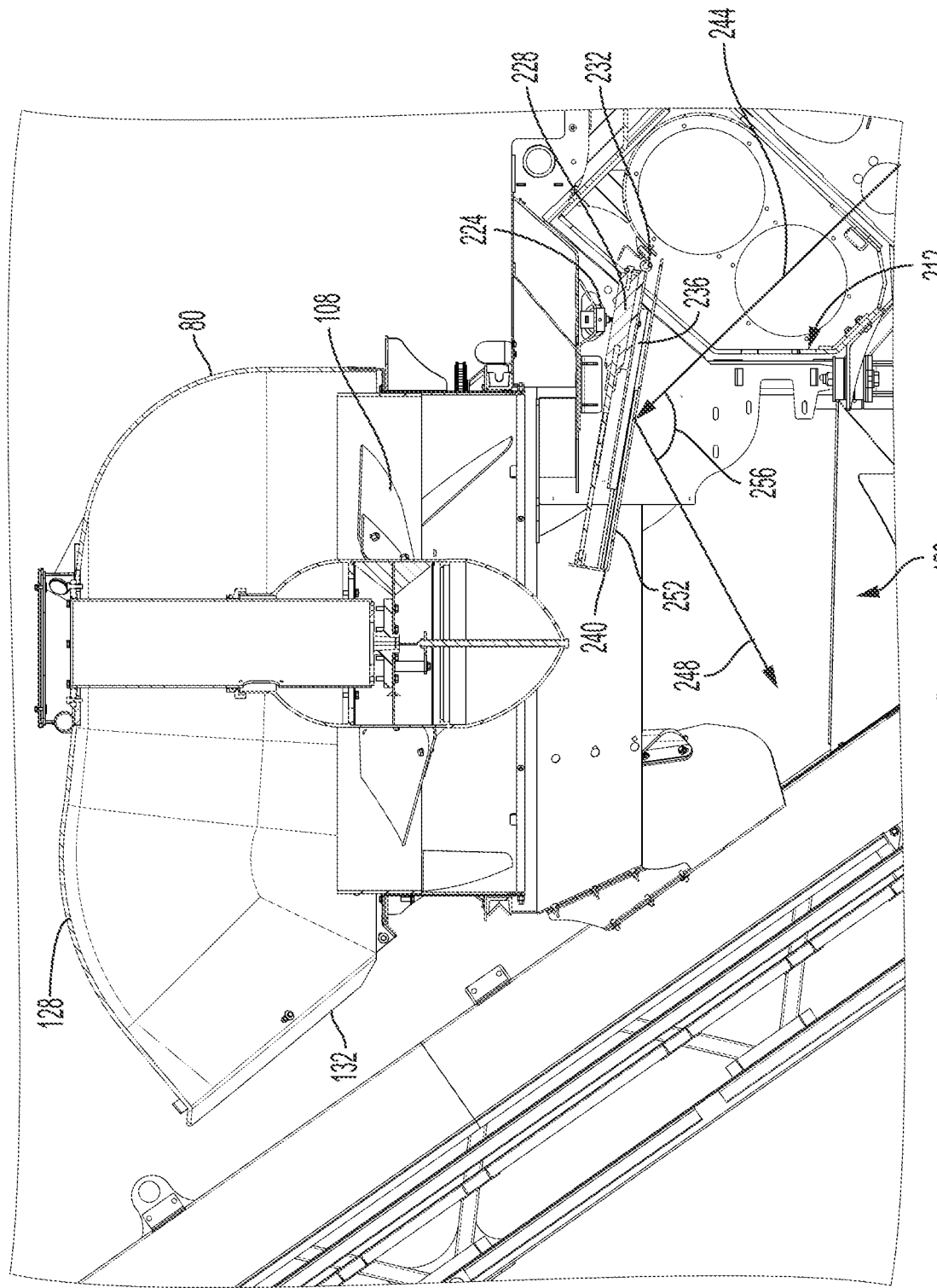
FIG. 7 is a cross-sectional view of the cleaning arrangement having the billet deflector in a fifth position and orientation.

FIG. 7 illustrates the billet deflector 208 in a fifth position and orientation that is between the first and second positions in terms of angle and length. The billet deflector 208 is adjustable to a multitude of different lengths between the maximum length and the minimum length by controlling the extension and retraction of the linear actuator 228. The billet deflector 208 is likewise adjustable to a multitude of different angles between the maximum angle and the minimum angle by controlling the extension and retraction of the linear actuator 224. FIG. 7 illustrates one of these multitudes of positions.

Figure 8:
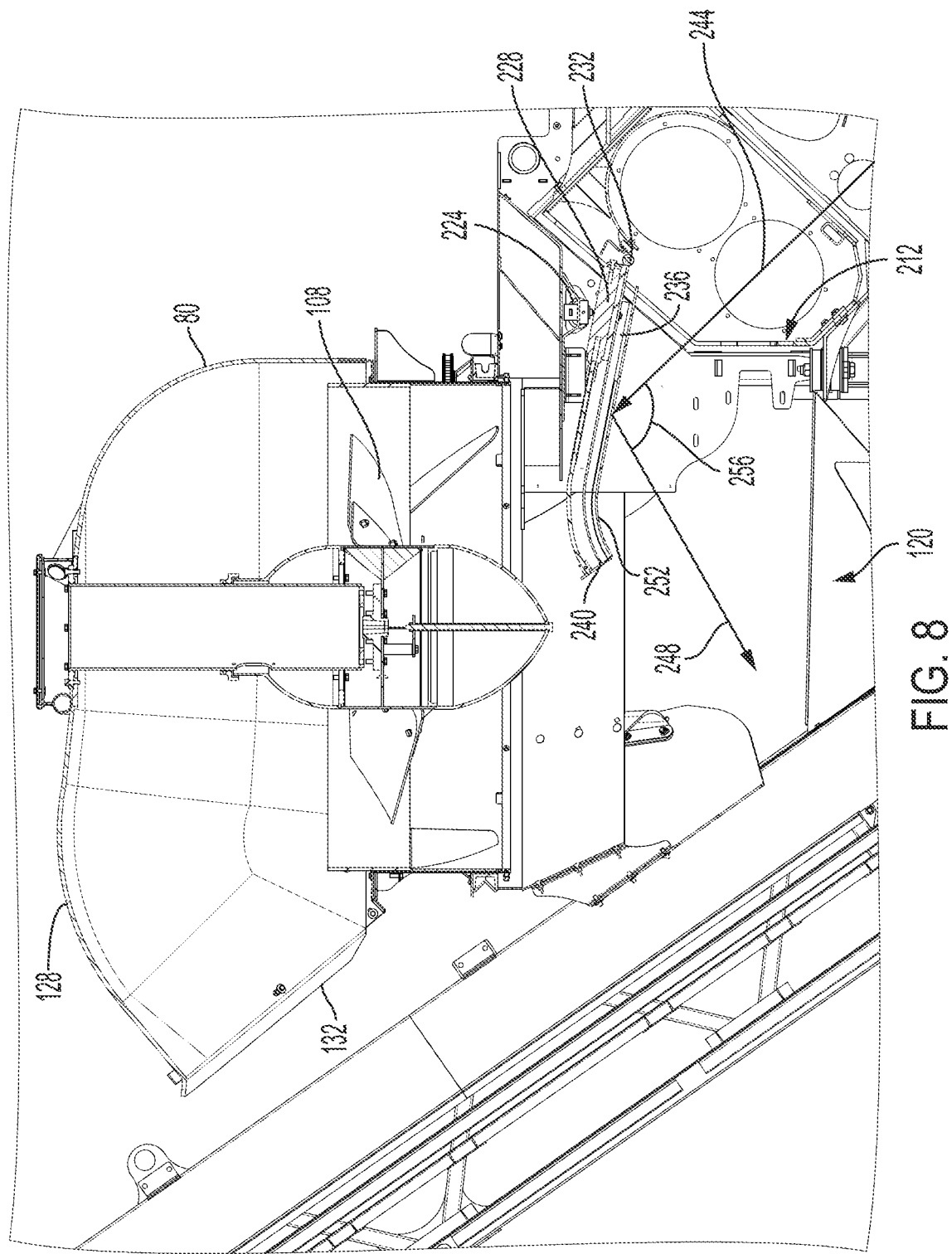
FIG. 8 is a cross-sectional view of the cleaning arrangement having the billet deflector in a sixth position and orientation.

FIG. 8 illustrates the deflector in a sixth position and orientation. The sixth position and orientation are similar to the fifth position, though additionally includes a bent distal end. As shown, in some embodiments, modifying the position of the billet deflector 208 can include bending a portion of the billet deflector 208. In some embodiments, the billet deflector 208 may be made of multiple distinct components or may be stressed to a curved position to further direct the crop billet B toward the outlet 216. The shape shown in FIG. 8 is only one of many non-linear shapes that may be generated in modifying the billet deflector 208. Other shapes include those with greater or less concavity, those that extend upward at the distal end, and those that provide increased or decreased aerodynamics of the material. For example, the billet deflector 208 may be shaped in a non-linear fashion to further break apart the billet material B from the extraneous plant matter.

Extending the deflector 208 into the cleaning chamber 120 assists in cane cleaning. The crop billet B and extraneous plant matter enter the inlet 212 of the cleaning chamber 120 as a mat of material and elongating the billet deflector allows the incoming mat of harvested material to travel at a closer proximity to the primary extractor fan 108 while still limiting or preventing the sugarcane loss at the fan 108. Airflow generated by the fan 108 has a greater velocity at locations near or closer to the blades of the fan 108 such that material extraction is increased the nearer the material is to the fan 108. Increasing the length of the deflector 208 moves the material closer to the blades of the fan 108, exposing the cane mat to higher air velocities, and increasing the separation between the billet material B and the extraneous plant matter while preventing the billets B from being extracted.

Additionally, the higher trajectory of the incoming material and the increased length of the deflector 208 allows for the material to travel across the cleaning chamber 120 at a greater height within the cleaning chamber 120 for a greater length of time, thereby increasing the extraction of extraneous plant matter through the outlet 132. By providing the material the ability to flow across the cleaning chamber 120 at differing trajectories based on the position of the billet deflector 208, the flight time or air time of the material can be increased or decreased to affect billet loss and extraneous plant matter harvest. The increased length of the deflector 208 additionally physically blocks the billets from being extracted out of the hood 128 at higher trajectories.

The separation of the mat from the inlet 212 into billet material B and extraneous plant matter is a dynamic process that occurs based on the movement of the material through the inlet 212, the impingement of the material against the billet deflector 208 and the walls of the cleaning chamber 120, and the airflow generated by the fan 108. The longer that the material remains in motion and exposed to increased air velocities, the more extraneous matter that will be extracted out of the chamber 120 into the field. The conditions that dictate an improved material flow include, but are not limited to crop density, field conditions, and harvesting speeds. By modifying the position of the billet deflector 208, the harvester 10 is configured to adapt to different field/ harvesting environments.

Figure 9:
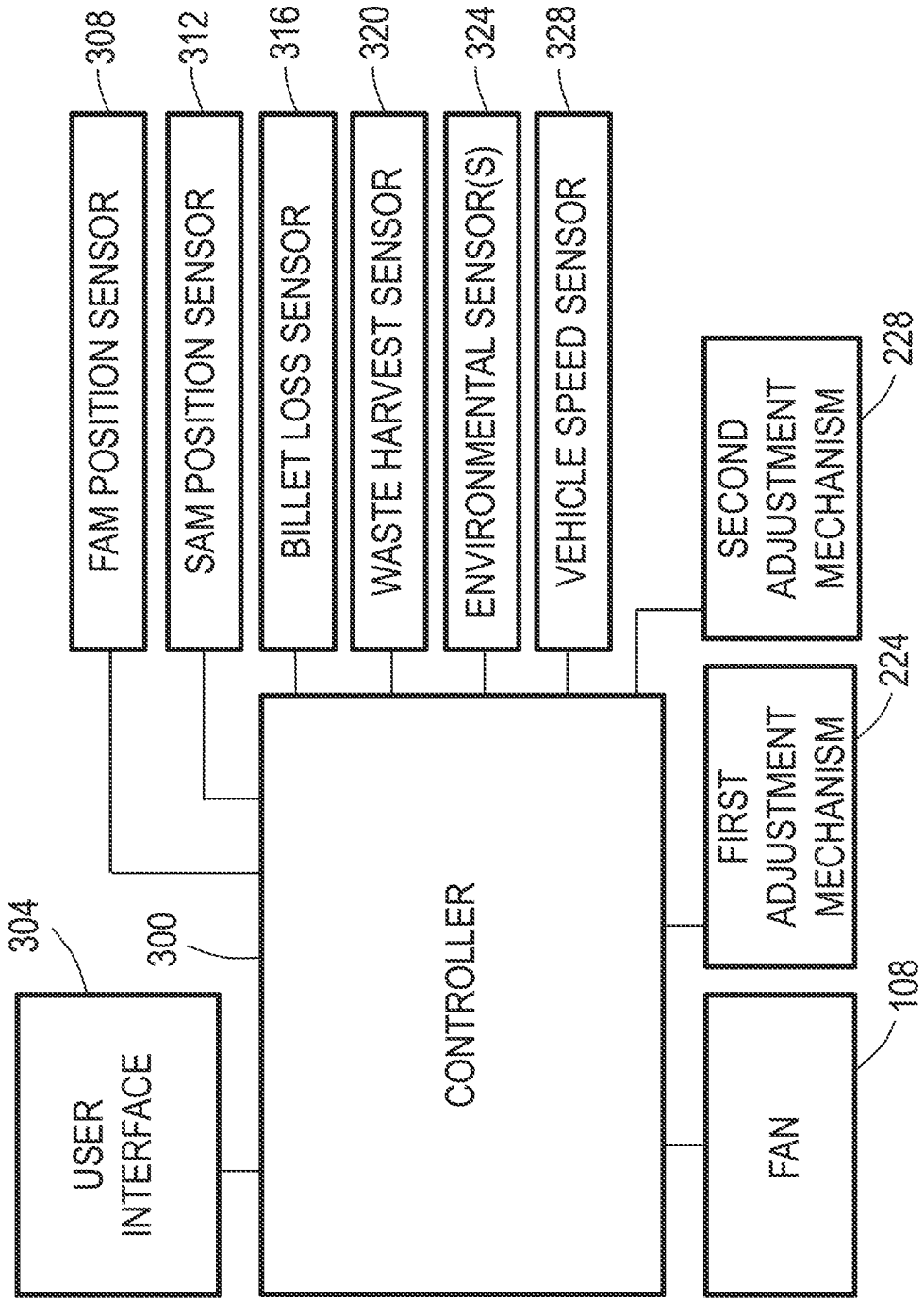
FIG. 9 is a schematic representation of a control system.
Figure 10:
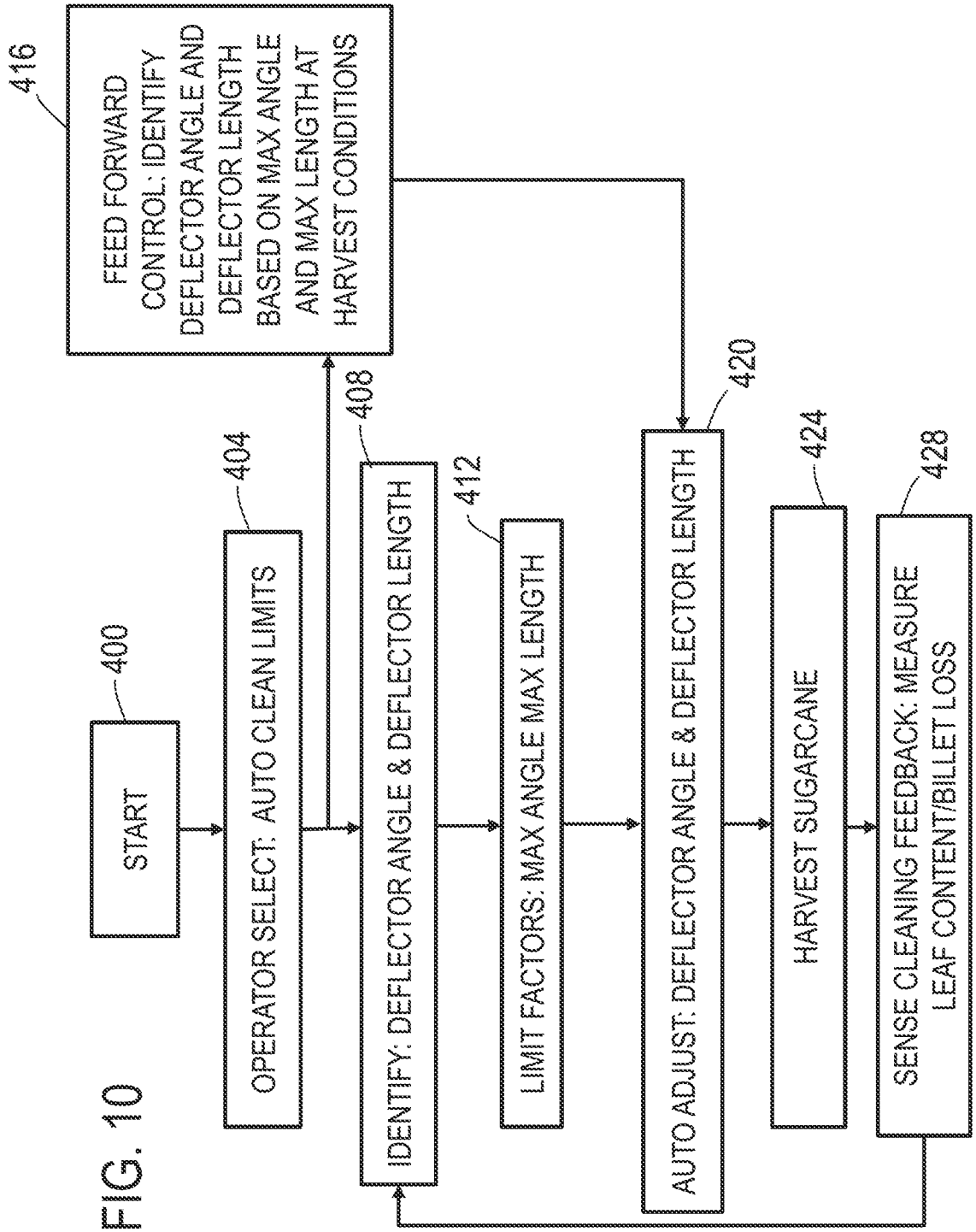
FIG. 10 is a flow chart illustrating a first operational mode for controlling the billet deflector.
Figure 11:
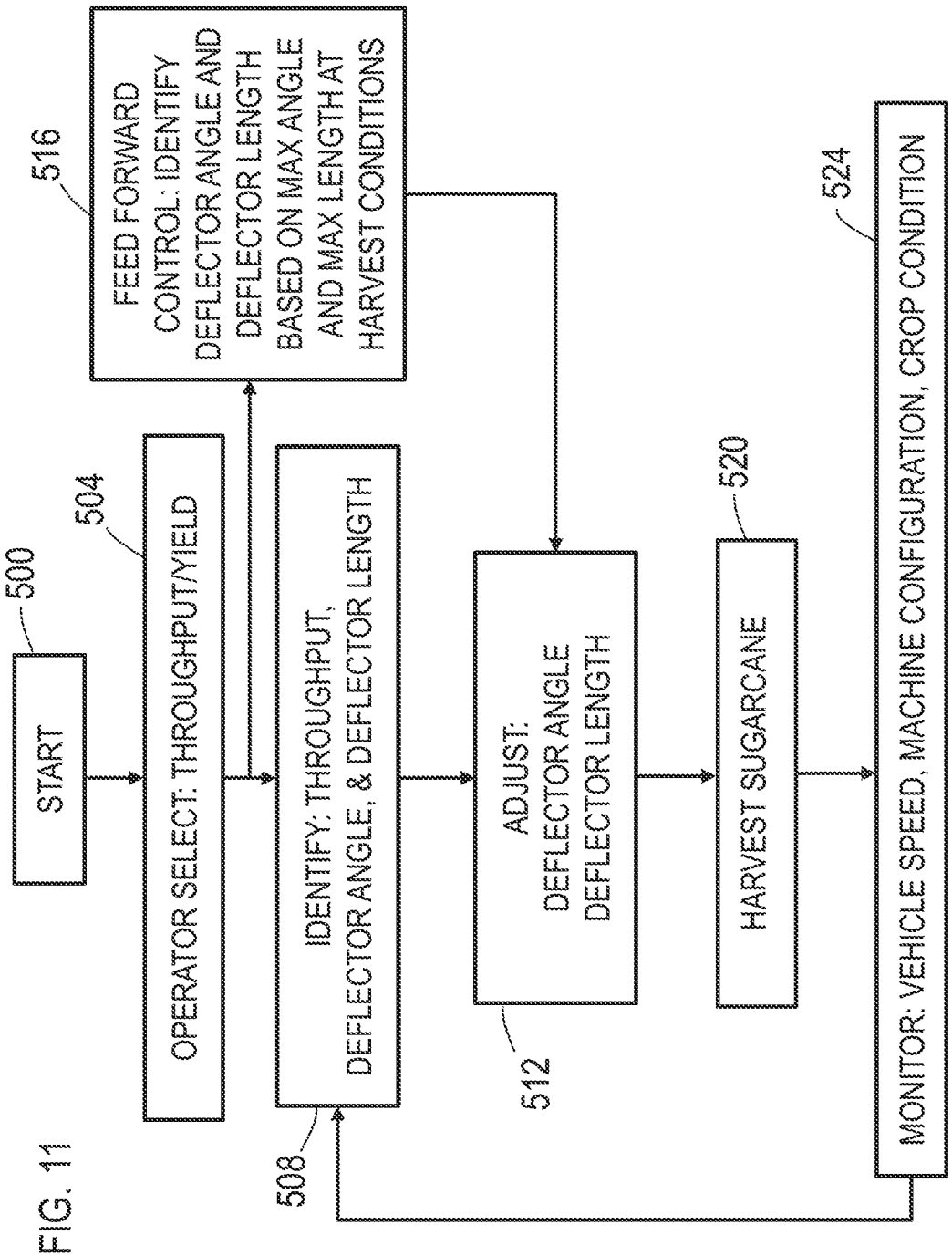
FIG. 11 is a flow chart illustrating a second operational mode for controlling the billet deflector.

FIG. 9 illustrates a schematic representation of a control system having a controller 300, a user interface 304, and a plurality of sensors 308, 312, 316, 320, 324, 328. The controller may be located within the harvester 10 and may be incorporated into the ECU of the harvester 10, may be electronically couplable to the ECU, or may be a separate system operable independent of the ECU. The controller 300 automatically modifies the position (including length, angle, curvature, etc.) of the billet deflector 208 based on various inputs from the user interface 304 and from the sensors 308, 312, 316, 320, 324, 328. Control schemes are shown in FIGS. 10-11. With continued reference to FIG. 9, the user interface 304 is a console located within the operator's cab 32 having one or more inputs such as a touch screen, switches, dials, and buttons that can be actuated by a user/operator for modifying operation of the harvester 10. The user interface 304 is electrically coupled to the controller 300 such that inputs provided by the user to the user interface 304 are transmitted to the controller 300. Additionally, the controller 300 is operable to provide signals that generate outputs at the user interface 304 indicating information (e.g., vehicle status, vehicle performance) calculated, stored in, or otherwise transmitted by the controller 300. In other embodiments, the angle and length of the billet deflector 208 are additionally or alternatively manually adjustable (via inputs in the cab, manually at the billet deflector 208).

A sensor 308 for the first adjustment mechanism 224 measures the displacement of the first adjustment mechanism 224. The displacement of the first adjustment mechanism 224 is indicative of an angle of the billet deflector 208 relative to the inlet 212 and fan 108. A sensor 312 for the second adjustment mechanism 228 measures the displacement of the second adjustment mechanism 228, indicative of the length of the billet deflector 208 between the retracted position and the extended position. Various angles and lengths are shown in the different positions of the billet deflector 208 shown in FIGS. 2A-8. The controller 300 is electrically coupled to the sensors 308, 312 and receives signals from the sensors 308, 312 that indicate the displacement of the first and second adjustment mechanisms 224, 228 and the angle and extension of the billet deflector 208 associated therewith.

In some embodiments, the harvester 10 is equipped with a billet loss sensor 316 that measures billet loss through the outlet 132 of the hood 128 and a waste harvest sensor 320 that measures the amount of extraneous plant matter that is harvested through the outlet 216 of the cleaning chamber 120. Written another way, the billet loss sensor 316 identifies how much billet (which should be harvested through the outlet 216) is lost through the outlet 132 intended for the extraneous plant matter and the waste harvest sensor 320 identifies how much waste (which should have been expelled through the outlet 132) is instead harvested with the billets material B through the outlet 216. These sensors 316, 320 may be, for example, optical sensors that provide a signal to the controller 300 that interprets the differences between billet material and the extraneous plan material to provide an estimate of the billet loss or waste harvest, respectively.

One or more environmental sensors 324 are located on and around the harvester 10 to determine different ambient conditions such as temperature, humidity, field conditions such as soil saturation level, plant density, geographical data, and ground angle/gradient. The environmental sensor(s) 324 provide signals to the controller 300 indicative of the volumetric throughput of the harvested material that will eventually be sent through the inlet 212 towards the billet deflector 208. The environmental sensor(s) 324 may additionally provide some characteristics (e.g., density, weight, height) of the harvested plant that aid the sensors 316, 320 in distinguishing between the billet material and the extraneous plant matter. A vehicle speed sensor 328 measures the velocity of the harvester 10. The controller 300 receives signals from the vehicle speed sensor that aid in determining a volumetric throughput of material through the harvester 10.

The controller is further programmed to provide signals to the fan 108 and to the first and second adjustment mechanisms 224, 228 to modify operational parameters (e.g., fan speed, position of the adjustment mechanisms 224, 228) in response to the signals provided by the sensors 308, 312, 316, 320, 324, 328.

FIG. 10 illustrates a flowchart detailing a method of separating the billet material from the extraneous plant material and specifically identifies how to automatically reposition the billet deflector 208 to maintain a desired range of billet loss and/or waste harvest. Beginning at start (step 400), an operator selects a range of allowable billet loss through the hood outlet 132 and/or allowable waste harvest through the outlet 216 of the cleaning system 78 (step 404). These ranges, also referred to as auto clean limits, may include a maximum limit and a minimum limit. In some embodiments, the auto clean limits may be manually entered by a user to the user interface 304. In other embodiments, the auto clean limits may be estimated or based on past values and with no input from the operator or merely confirmation from an operator. In some embodiments, the auto clean limits may default to preset or most recent values unless modified by an operator. A look-up table may be provided and/or settings may be suggested based on material throughput or desired residue and cleaning levels. In some embodiments, a position sweep may determine an optimal angle and length per harvesting operation. With the auto clean limits determined, the length and angle of the billet deflector 208 are determined (step 408) within the limits (total range of motion in length and angle) of the billet deflector 208 (step 412). More specifically, the controller 300 interprets the signals from the first and second adjustment mechanism sensors 308, 312, which identify the positions of the first and second adjustment mechanisms 224, 228. As the first and second adjustment mechanisms 224, 228 drive and control movement of the billet deflector 208, the controller 300 identifies the angle of the billet deflector 208 based on the signal from the first adjustment mechanism position sensor 308 and identifies the length of the billet deflector 208 based on the signal from the second adjustment mechanism position sensor 312. In some embodiments, only the length or the angle (or the curvature) of the billet deflector 208 is adjustable and the controller only identifies those positions that are adjustable.

The controller 300 may additionally operate with feed forward control (step 416) as a predictive function that anticipates harvesting changes such as machine speed and crop conditions such as moisture and density. The controller 300 makes adjustments accordingly.

As the harvester 10 operates, the billet loss sensor 316 and waste harvest sensor 320 provide signals to the controller identifying the billet losses and the harvested leaf content, respectively. These values are compared to the selected auto clean limits. If one or both of the sensed billet loss and waste harvest fall outside of the selected range, and/or in response to the predictive functionality of the feed forward control, the controller 300 provides signals to one or both of the first and second adjustment mechanisms 224, 228 to modify the position (length, angle, curvature) of the billet deflector 208 (step 420). For example, if the billet loss is too high, the controller 300 may provide a signal to increase the displacement of the second adjustment mechanism to increase the length of the billet deflector 208. Additionally, or alternatively, the controller 300 may provide a signal to increase the length of the first adjustment mechanism 224 to decrease the impingement angle at the billet deflector 208. Additional adjustments, such as adjusting the speed of the fan 108 may be made to modify the billet loss/waste harvest at this time.

Throughout this control scheme, the harvester 10 functions to harvest sugarcane (step 420). The controller 300 functions to maintain the actual harvest within the auto clean limits and modifies the position of the billet deflector 208 based on the measured parameters to improve the harvest (step 428). With adjustments made, the controller 300 cycles back to step 408 to reidentify the position of the billet deflector 208 and the billet loss/waste harvest to determine if they have returned to the auto clean limits.

The flowchart detailed in FIG. 10 may be modified to operate as a modified, alternative control scheme. Rather than querying for an angle and length of the billet deflector 208, the controller 300 can cycle the position of the billet deflector 208 through a plurality of predetermined positions, measuring the billet loss and waste harvest at each position. In this embodiment, the controller 300 determines which position has the most desirable parameters (least billet loss and least waste harvest/extraneous plant matter sent to the mill) and defaults the billet deflector 208 to this position. The controller 300 additionally documents and records the most desirable/optimal parameters such that these parameters are available and can be recommended in future harvesting operations having similar environmental and vehicle operating conditions. A report can be generated based on the different parameters, comparing the measured loss/harvest values to the different positions of the billet deflector 208. In some embodiments, the controller 300 can identify that the field conditions (e.g., material throughput and/or other measurable parameters) are similar to previous field conditions. In response to identifying these similarities, the controller 300 can provide a signal to the operator, recommending a specific position (e.g., length, angle) of the billet deflector 208 or otherwise automatically changing the position of the billet deflector 208 to the specific position.

FIG. 11 illustrates a flowchart detailing an alternative method of separating the billet material from the extraneous plant material. The method shown in FIG. 11 may be utilized, for example, when the harvester 10 is not equipped with a billet loss sensor 316 or a waste harvest sensor 320 or alternatively if one or both of the billet loss sensor 316 and the waste harvest sensor 320 are inoperable. Beginning at start (step 500), an operator selects a volumetric throughput or yield of the material through the harvester 10 (step 504). The throughput may be dependent upon material and field conditions and the controller may therefore reference lookup tables and signals from environmental sensors 324 and the vehicle speed sensor 328. for the field and material. The throughput may therefore be calculated/estimated based on the output of sensors. Additionally, or alternatively, the throughput may be based only on operator input to the user interface 304.

The throughput is identified in addition to the angle and length of the deflector (step 508), similar to step 408 of the flow chart shown in FIG. 10. The controller 300 adjusts the angle and length of the billet deflector 208 (step 512) to maintain the desired throughput. The controller 300 may additionally operate with feed forward control (step 516) as a predictive function that anticipates harvesting changes such as machine speed and crop conditions such as moisture and density. The controller 300 makes adjustments to the angle and length of the deflector 208 accordingly. Further modifications to the position of the billet deflector 208 are based on continued monitoring of environmental conditions such as the crop conditions and the machine configuration as well as the vehicle speed (step 524).

Throughout this further control scheme, the harvester 10 functions to harvest sugarcane (step 520). The controller 300 functions to maintain a consistent harvest. If the throughput is based on sensors, the position of the billet deflector 208 is modified based on the changes to the throughput or other harvesting conditions identified by the sensors. Alternatively or additionally, the position of the billet deflector 208 can be modified by a new operator input (e.g., selecting a different volumetric throughput).

The billet deflector 208 may be further movable and controllable by the controller 300 in non-harvesting operations. For example, when changing or sharpening blades within the harvester 10, it may be desirable to move the billet deflector 208 to a particular angle or extend/retract the billet deflector 208 to a certain length so that the billet deflector 208 provides clearance to more easily access the blades. In some embodiments, the controller 300 may automatically move the billet deflector 208 to a predefined position (length and angle) upon key-off (i.e., powering down the harvester), or based on an input to a control device within the cab of the harvester 10. In still further embodiments, an input may be located near the blades (i.e., near a panel that is removed to access the blades, within the harvester, adjacent the blades) or near the billet deflector 208 that, when activated, returns the billet deflector 208 to the predefined position. In some embodiments, the predefined position is not fully extended (e.g., fully retracted, partially retracted).

Various features of the disclosure are set forth in the following claims.

What is claimed is:

1. A cleaning arrangement for separating a billet material from an extraneous plant matter in a sugarcane harvester, the cleaning arrangement comprising:
    a cleaning chamber defining an inlet for the billet material and the extraneous plant matter, a first outlet for the extraneous plant matter, and a second outlet for the billet material;
    a fan positioned within the cleaning chamber and configured to generate an airflow to direct the extraneous plant matter toward the first outlet;
    a billet deflector located between the inlet and the first outlet and configured to direct the billet material toward the second outlet;
    an actuation mechanism coupled to the billet deflector and controllable to adjust the position of the billet deflector;
    a sensor configured to generate a signal; and
    a controller programmed to activate the actuation mechanism to adjust the position of the billet deflector based on the signal.

2. The cleaning arrangement of claim 1, wherein the billet deflector is rotatable relative to the fan between a first position and a second position to adjust the position of the billet deflector.

3. The cleaning arrangement of claim 1, wherein the billet deflector has a length extending between a first end adjacent the inlet and a second end spaced apart from the inlet, and wherein the length of the billet deflector is adjustable to adjust the position of the billet deflector.

4. The cleaning arrangement of claim 1, wherein a curvilinearity of the billet deflector is adjustable between a first position in which a portion of the billet deflector has a linear profile and a second position in which the portion of the billet deflector has a curved profile.

5. The cleaning arrangement of claim 1, wherein the actuation mechanism is a linear actuator.

6. The cleaning arrangement of claim 1, wherein the signal corresponds to an amount of the billet material through the first outlet and/or an amount of the extraneous plant matter through the second outlet.

7. The cleaning arrangement of claim 6, wherein the controller is programmed to maintain the amount of the billet material through the first outlet and/or the amount of the extraneous plant matter through the second outlet below a predetermined threshold by activating the actuation mechanism to adjust the position of the billet deflector.

8. The cleaning arrangement of claim 1, wherein the signal corresponds to vehicle speed of the sugarcane harvester, a throughput of the billet material and extraneous plant material to the inlet of the cleaning arrangement, and/or a crop condition.

9. The cleaning arrangement of claim 1, wherein the sensor is a first sensor and the signal is a first signal, the cleaning arrangement further comprising a second sensor configured to generate a second signal indicative of the position of the billet deflector, wherein the controller is programmed to compare the position of the billet deflector to a desired position of the billet deflector.

10. The cleaning arrangement of claim 1, wherein the inlet is located at a height below the fan, wherein the first outlet is located above the inlet, and wherein the second outlet is located below the inlet.

11. A method of separating a billet material from an extraneous plant matter in a sugarcane harvester, the method comprising:

impinging the billet material against a billet deflector to direct the billet material across a cleaning chamber, modifying a trajectory of the billet material away from a first outlet and towards a second outlet;

monitoring an output signal of a sensor;

determining whether the output signal is outside of a predetermined range; and activating an actuation mechanism in response to the signal to modify a position of the billet deflector relative to a fan when the output signal is outside of the predetermined range.

12. The method of claim 11, wherein modifying the position of the billet deflector includes modifying an angle of the billet deflector relative to the fan, modifying a length of the billet deflector, and/or modifying a curvilinear profile of the billet deflector.

13. The method of claim 11, wherein monitoring an output signal of a sensor includes monitoring an amount of the billet material through the first outlet and/or an amount of the extraneous plant matter through the second outlet.

14. The method of claim 11, wherein monitoring an output signal of a sensor includes monitoring a speed of the sugarcane harvester, a volumetric rate of the billet material and extraneous plant matter harvested by the sugarcane harvester, and/or a crop condition.

15. The method of claim 11, further comprising measuring a current position of the billet deflector and comparing the current position of the billet deflector to a desired position of the billet deflector.

16. A cleaning arrangement for separating a billet material from an extraneous plant matter in a sugarcane harvester, the cleaning arrangement comprising:

a cleaning chamber defining an inlet for the billet material and the extraneous plant matter, a first outlet for the extraneous plant matter, and a second outlet for the billet material;

a fan positioned within the cleaning chamber and configured to generate an airflow to direct the extraneous plant matter toward the first outlet;

a billet deflector located between the inlet and the first outlet and configured to direct the billet material toward the second outlet;

an actuation mechanism coupled to the billet deflector and controllable to adjust the position of the billet deflector; and a controller programmed to compare a current position of the billet deflector to a desired position of the billet deflector, the controller programmed to activate the actuation mechanism if the current position of the billet deflector differs from the desired position of the billet deflector by more than a predetermined threshold.

17. The cleaning arrangement of claim 16, wherein the billet deflector is rotatable relative to the fan between a first position and a second position to adjust the position of the billet deflector.

18. The cleaning arrangement of claim 16, wherein the billet deflector has a length extending between a first end adjacent the inlet and a second end spaced apart from the inlet, and wherein the length of the billet deflector is adjustable to adjust the position of the billet deflector.

19. The cleaning arrangement of claim 16, wherein a curvilinearity of the billet deflector is adjustable between a first position in which a portion of the billet deflector has a linear profile and a second position in which the portion of the billet deflector has a curved profile.

20. The cleaning arrangement of claim 16, wherein the inlet is located at a height below the fan, wherein the first outlet is located above the inlet, and wherein the second outlet is located below the inlet.

* * * * *